US 12,255,355 B2

(12) United States Patent
Kim et al.

(10) Patent No.: US 12,255,355 B2
(45) Date of Patent: Mar. 18, 2025

(54) BATTERY MODULE INCLUDING BUS BAR FRAME WITH FIXING PORTIONS COVERING BUS BAR AND BATTERY PACK INCLUDING THE SAME

(71) Applicant: LG Energy Solution, Ltd., Seoul (KR)

(72) Inventors: Soo Youl Kim, Daejeon (KR); Youngho Lee, Daejeon (KR); Han Ki Yoon, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 627 days.

(21) Appl. No.: 17/600,724

(22) PCT Filed: Jun. 10, 2020

(86) PCT No.: PCT/KR2020/007515
§ 371 (c)(1),
(2) Date: Oct. 1, 2021

(87) PCT Pub. No.: WO2020/262852
PCT Pub. Date: Dec. 30, 2020

(65) Prior Publication Data
US 2022/0052423 A1 Feb. 17, 2022

(30) Foreign Application Priority Data
Jun. 25, 2019 (KR) .......................... 10-2019-0075828

(51) Int. Cl.
*H01M 50/503* (2021.01)
*H01M 50/211* (2021.01)
*H01M 50/516* (2021.01)

(52) U.S. Cl.
CPC ....... *H01M 50/503* (2021.01); *H01M 50/211* (2021.01); *H01M 50/516* (2021.01)

(58) Field of Classification Search
CPC . H01M 50/503; H01M 50/516; H01M 50/211
(Continued)

(56) References Cited

U.S. PATENT DOCUMENTS

2011/0097620 A1  4/2011  Kim
2013/0236761 A1*  9/2013  Seong ................. H01M 50/264
439/212

(Continued)

FOREIGN PATENT DOCUMENTS

CN  105531850 A  4/2016
CN  110492278 A * 11/2019 .......... H01M 50/502
(Continued)

OTHER PUBLICATIONS

International Search Report for Application No. PCT/KR2020/007515, dated Sep. 16, 2020, 2 pages.
(Continued)

*Primary Examiner* — Sean P Cullen
(74) *Attorney, Agent, or Firm* — Lerner David LLP

(57) ABSTRACT

A battery module according to an exemplary embodiment of the present invention includes: a battery cell stacked body where a plurality of battery cells are stacked; a bus bar frame that is formed in a front side and a rear side of the battery cell stacked body; and a bus bar formed at an outer side of the bus bar frame with reference to the battery cell stacked body and arranged to be electrically connected with an external power source, wherein the bus bar frame includes a plurality of fixing portions that protrude from the bus bar frame to cover an end of the bus bar.

11 Claims, 6 Drawing Sheets

(58) Field of Classification Search
USPC .................................. 429/156, 157, 158, 159
See application file for complete search history.

(56) References Cited

U.S. PATENT DOCUMENTS

| | | | |
|---|---|---|---|
| 2014/0030581 A1 | 1/2014 | Kim | |
| 2015/0303415 A1* | 10/2015 | Kayano | H01M 50/51 |
| | | | 429/159 |
| 2016/0233476 A1 | 8/2016 | Okamoto et al. | |
| 2016/0372733 A1* | 12/2016 | Benedict | H01M 50/227 |
| 2018/0194235 A1 | 7/2018 | Kim et al. | |
| 2018/0248166 A1* | 8/2018 | Ryu | H01M 50/211 |
| 2018/0315977 A1 | 11/2018 | Park et al. | |
| 2019/0341594 A1* | 11/2019 | Morisato | H01M 50/534 |
| 2020/0144580 A1 | 5/2020 | Hong et al. | |
| 2020/0189400 A1 | 6/2020 | Kim et al. | |
| 2020/0203698 A1 | 6/2020 | Jin et al. | |

FOREIGN PATENT DOCUMENTS

| | | | | |
|---|---|---|---|---|
| CN | 110915024 A | | 3/2020 | |
| EP | 2919294 A1 | | 9/2015 | |
| EP | 3046164 A1 | | 7/2016 | |
| EP | 3637501 A1 | | 4/2020 | |
| EP | 3637503 A1 | | 4/2020 | |
| JP | 2003346780 A | | 12/2003 | |
| JP | 2007109548 A | | 4/2007 | |
| JP | 2010061961 A | | 3/2010 | |
| JP | 2015056342 A | | 3/2015 | |
| JP | 2018137195 A | | 8/2018 | |
| JP | 2020518988 A | | 6/2020 | |
| KR | 20110044130 A | | 4/2011 | |
| KR | 20160043038 A | | 4/2016 | |
| KR | 2017066896 A | * | 6/2017 | ........... G01R 31/362 |
| KR | 20170075374 A | | 7/2017 | |
| KR | 20170103232 A | | 9/2017 | |
| KR | 20180022480 A | | 3/2018 | |
| KR | 20180097897 A | | 9/2018 | |
| KR | 20180116958 A | | 10/2018 | |
| KR | 20180119991 A | | 11/2018 | |
| KR | 20190056013 A | | 5/2019 | |
| KR | 20190071454 A | | 6/2019 | |
| WO | 2015037505 A1 | | 3/2015 | |
| WO | WO-2018134982 A1 | * | 7/2018 | ............ H01M 2/202 |
| WO | WO-2018159928 A1 | * | 9/2018 | ............ F16M 11/22 |
| WO | 2019074206 A1 | | 4/2019 | |
| WO | 2019117514 A1 | | 6/2019 | |

OTHER PUBLICATIONS

Extended European Search Report for Application No. 20831379.1 dated Mar. 3, 2022. 7 pgs.

* cited by examiner (a)

(b)

BATTERY MODULE INCLUDING BUS BAR FRAME WITH FIXING PORTIONS COVERING BUS BAR AND BATTERY PACK INCLUDING THE SAME

CROSS-REFERENCE TO RELATED APPLICATION

This application is a national phase entry under 35 U.S.C. § 371 of PCT/KR2020/007515 filed on Jun. 10, 2020 and claims priority to and the benefit of Korean Patent Application No. 10-2019-0075828 filed in the Korean Intellectual Property Office on Jun. 25, 2019, the entire contents of which are each incorporated herein by reference.

TECHNICAL FIELD

The present invention relates to a battery module and a battery pack including the same, and more specifically, it relates to a battery module that can reduce a size of a battery module, and is easily applicable without changing a configuration of constituent elements even though a configuration of a battery cell stacked body is changed, and a battery pack including the battery module.

BACKGROUND ART

Secondary batteries with high ease of application according to product groups and having electrical characteristics such as high energy density are widely applied not only to portable devices, but also to electric vehicles or hybrid vehicles driven by electric drive sources, and power storage devices. Such a secondary battery is attracting attention as a new energy source for enhancing environmental-friendliness and energy efficiency not only as a primary merit that can remarkably reduce the use of fossil fuels, but also because by-products from the use of energy are not generated at all.

One or a couple of battery cells per device are used for small mobile devices, whereas medium and large devices such as automobiles require high power/large capacity. Therefore, a medium or large-sized battery module with a plurality of battery cells electrically connected to it is used.

Meanwhile, as the need for a large capacity structure including use as an energy storage source in recent years increases, the demand for a multi-module structure battery pack in which a plurality of secondary batteries are assembled in series and/or coupled in parallel is increasing.

When connecting a battery cell stacked body and a bus bar in a battery module, a connection portion of an electrode lead of the battery cell and the bus bar may vary according to the number of battery cells included in the battery cell stacked body, and accordingly, a length of the electrode lead may be excessively extended. In addition, when adjusting the number of bus bars for connection with the bus bars in a range where the length of the electrode lead does not increase, a configuration of a bus bar frame to which the bus bars are connected must be changed each time the number of bus bars is changed, which is inconvenient. Therefore, it is necessary to design the configuration of the bus bar and bus bar frame so that the structure can be easily changed in response to the change in the number of battery cells, without extending the length of the electrode lead.

DISCLOSURE

Technical Problem

The present invention has made an effort to provide a battery module that includes a bus bar and a bus bar frame of which structures can be easily changed in response to a change in the number of battery cells, without extending the length of an electrode lead, and a battery pack.

However, the problems to be solved by the exemplary embodiments of the present invention are not limited to the above-described problems, and may be variously expanded in the range of technical ideas included in the present invention.

Technical Solution

A battery module according to an exemplary embodiment of the present invention includes: a battery cell stacked body where a plurality of battery cells are stacked; a bus bar frame that is formed in a front side and a rear side of the battery cell stacked body; and a bus bar formed at an outer side of the bus bar frame with reference to the battery cell stacked body and arranged to be electrically connected with an external power source, wherein the bus bar frame includes a plurality of fixing portions that protrude from the bus bar frame to cover an end of the bus bar.

The bus bar may be formed in a shape of a flat plate having a slit with one open end (e.g., in a u-shape).

The fixing portions may be formed to cover opposite ends of the bus bar in a first direction, which is a length direction of the bus bar.

At least one of the fixing portions may include a hook protruded toward the bus bar, and a groove that is engaged with the hook at opposite ends of the bus bar.

At least one of the fixing portions may include a holder protruded toward the bus bar from the bus bar frame.

The holder may include two clamp portions that protruded from a bottom surface of the bus bar frame, and include inclined surfaces that are formed to face each other at ends of the two clamp portions.

Each of the battery cells may include an electrode lead that is protruded toward the bus bar frame, and, two electrode leads protruded from neighboring battery cells among the electrode leads and may pass between the slit of the bus bar or between the plurality of bus bars and may overlap at one side of the bus bar.

A welding portion may be formed in a portion where the electrode lead and the bus bar overlap.

Each of the battery cells may include an electrode lead protruded toward the bus bar frame, and a width of the electrode lead in the first direction, which is a length direction of the bus bar, may be equal to or smaller than a length of the slit.

A gap between neighboring fixing portions among the plurality of fixing portions may be larger than a width of the slit and smaller than a width of the bus bar.

A battery pack according to another exemplary embodiment of the present invention may include: the above-state at least one battery module, and a pack case that packages the at least one battery module.

A device according to another exemplary embodiment of the present invention may include the above-stated at least one battery pack.

Advantageous Effects

According to the exemplary embodiments, a battery module of which one end of a bus bar includes a slit with one open end, and a bus bar frame includes the fixing portion that covers an end of the bus bar such that the bus bar can be easily connected without causing an increase of a length of the electrode lead and without changing a structure of the bus bar frame even when the number of battery cells is changed.

MODE FOR INVENTION

Figure 1:
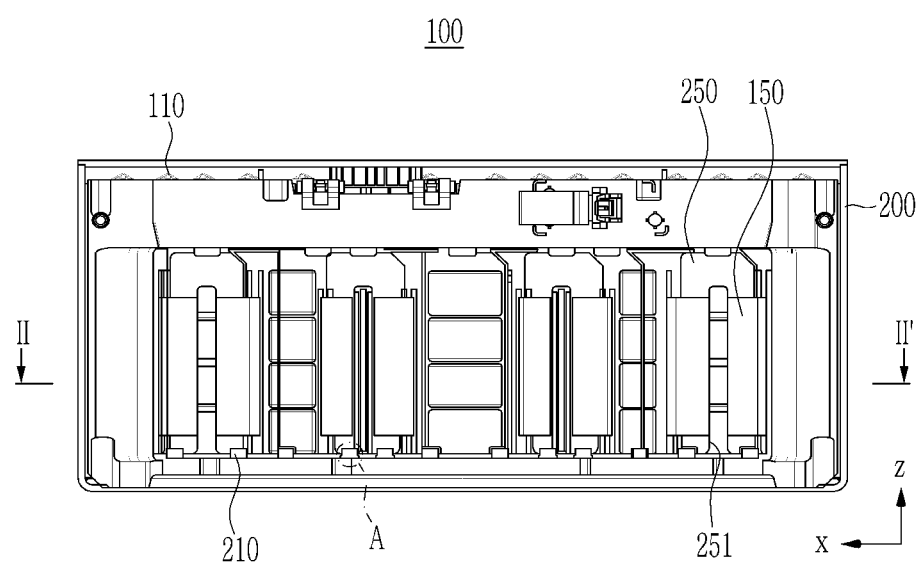
FIG. 1 is a front view of a battery module according to an exemplary embodiment of the present invention.

Hereinafter, various exemplary embodiments of the present invention will be described in detail with reference to the accompanying drawings so that those skilled in the art may easily practice the present invention. The present invention may be embodied in many different forms and should not be construed as limited to the exemplary embodiments set forth here.

Accordingly, the drawings and description are to be regarded as illustrative in nature and not restrictive, and like reference numerals designate like elements throughout the specification.

Because the size and thickness of each configuration shown in the drawings are arbitrarily shown for better understanding and ease of description, the present invention is not limited thereto, and the thicknesses of portions and regions are exaggerated for clarity. In the drawings, the thickness of layers, films, panels, regions, etc., are exaggerated for clarity. In addition, in the drawings, for convenience of explanation, the thicknesses of some layers and regions are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. In addition, when an element is referred to as being "on" a reference element, it can be positioned on or beneath the reference element, and is not necessarily positioned on the reference element in an opposite direction to gravity.

Further, unless explicitly described to the contrary, the word "comprise" and variations such as "comprises" or "comprising" will be understood to imply the inclusion of stated elements but not the exclusion of any other elements.

In addition, in this specification, the phrase "on a plane" means viewing a target portion from the top, and the phrase "on a cross-section" means viewing a cross-section formed by vertically cutting a target portion from the side.

Hereinafter, referring to FIG. 1 to FIG. 3, a battery module according to an exemplary embodiment of the present invention will be described.

Figure 2:
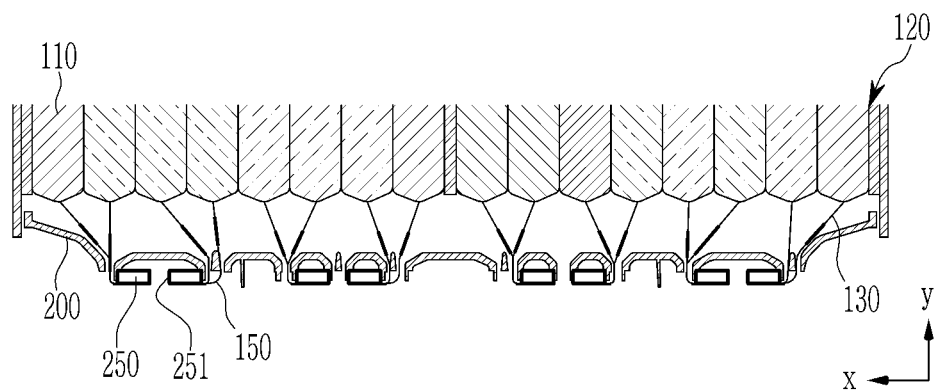
FIG. 2 is a cross-section of FIG. 1, taken along the line II-II'.
Figure 3:
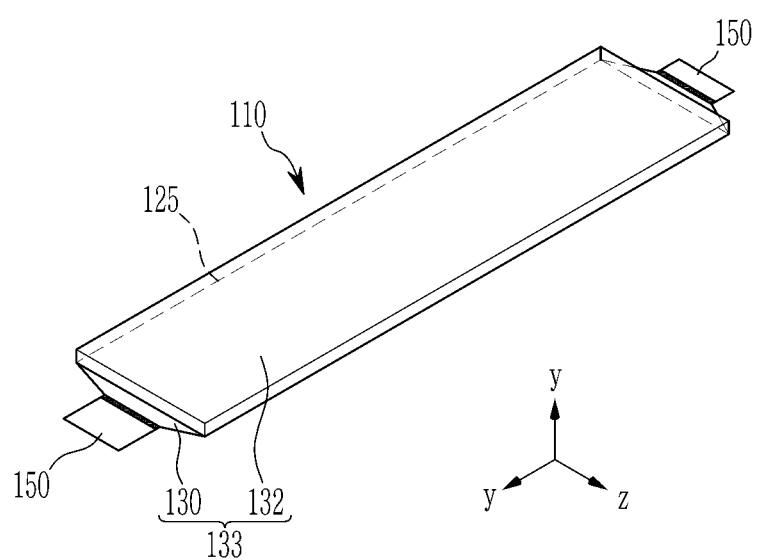
FIG. 3 is a perspective view of a battery cell of FIG. 1.

FIG. 1 is a front view of a battery module according to an exemplary embodiment of the present invention, FIG. 2 is a cross-section of FIG. 1, taken along the line II-II', and FIG. 3 is a perspective view of a battery cell of FIG. 1.

Referring to FIG. 1 and FIG. 2, a battery module 100 according to the present exemplary embodiment may include a battery cell stacked body 120 where a plurality of battery cells 110 are stacked, electrode leads 150 respectively protruded from opposite ends of the battery cell stacked body 120, a bus bar frame 200, and a bus bar 250. The plurality of battery cells 110 may be stacked along x-axis direction. The bus bar frame 200 includes a lead slit, the lead slit is aligned to correspond to a slit 251 formed in the bus bar 250, and the electrode lead 150 may be electrically connected to the bus bar 250. The bus bar 250 according to the present exemplary embodiment may be formed of a metal material.

Hereinafter, referring to FIG. 3, a configuration of a single battery cell 110 will be described.

The battery cell 110 is a secondary battery, and may be formed as a pouch-type secondary battery. The battery cell 110 may be provided in plural, and a plurality of battery cells 110 may be stacked together so as to be electrically connected to each other thereby forming a battery cell stack 120. Each of the plurality of battery cells 110 may include an electrode assembly 125, a cell case 133, and an electrode lead 150 protruded from the electrode assembly 125.

The electrode assembly 125 may be formed of a positive plate, a negative plate, and a separator. The cell case 133 is provided to package the electrode assembly 125, and may be formed of a laminate sheet including a resin layer and a metal layer. Such a cell case 133 may include a case body 132 and a cell terrace 130. The case body 132 may accommodate the electrode assembly 125. For this, the case body 132 may be provided with an accommodating space for accommodating the electrode assembly 125. The cell terrace 130 extends from the case body 132, and is sealed to encapsulate the electrode assembly 125. The electrode lead 150 may be partially provided from one side of the cell terrace 130, specifically, a front side (i.e., y-axis direction) of the cell terrace 130.

The electrode lead 150 may be electrically connected with the electrode assembly 125. Such an electrode lead 150 may be provided as a pair. Some of the pair of electrode leads 150 may respectively protrude to the outside from the front side and a rear side (i.e., y-axis direction) of the cell case 133. The configuration of the battery cell 110 described above is an example, and the shape of the battery cell 110 for forming the battery cell stack 120 may be variously modified.

Referring to FIG. 1, the bus bar 250 according to the present exemplary embodiment includes the slit 251 through which the electrode lead 150 can pass. In this case, the slit 251 is opened at one end of the bus bar 250. That is, the bus bar 250 may have a flat plate shape including the slit 251 with one end open. Due to such a structure, it is possible to assemble the electrode lead 150 without interference according to the size of the slit 251 in the process of making the electrode lead 150 pass through the slit 251 and overlap one side of the bus bar 250. A width (i.e., in the z-axis direction) of the electrode lead 150 may be equal to or smaller than a length of the slit 251.

Meanwhile, by adopting the bus bar 250 that includes the slit 251 having one end open, even if the number of battery cells 110 included in the battery cell stacked body 120 is changed, the bus bar 250 can be easily combined without excessively extending the length (y-axis direction) of the electrode lead 150.

Figure 4:
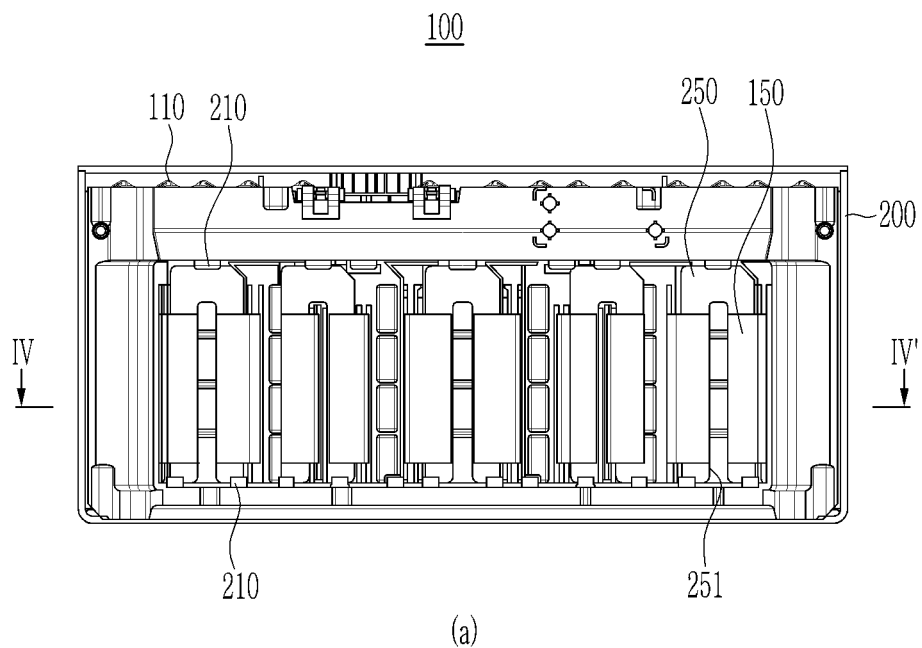
FIG. 4 shows another implementation aspect in the battery module according to the exemplary embodiment of the present invention.
Figure 4:
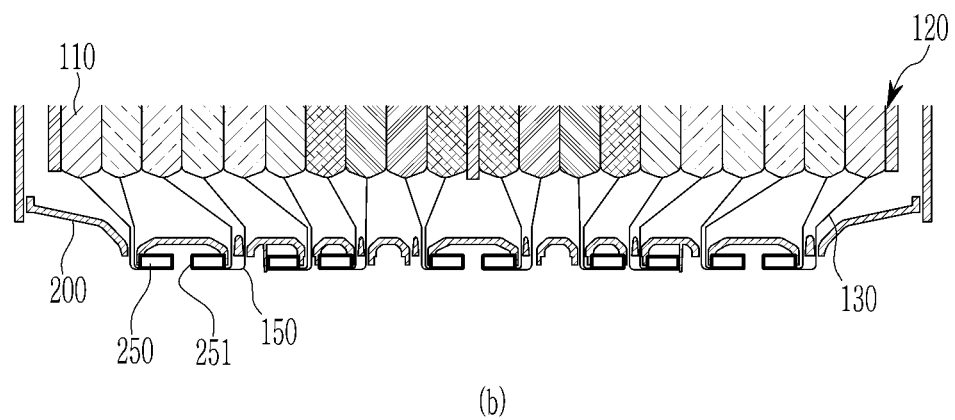

For example, in the case of FIG. 2, the battery cell stacked body 120 includes two sets of eight battery cells 110, and in case of FIG. 4, the battery cell stacked body 120 includes two sets of ten battery cells 110. In case of applying a conventional flat type of bus bar (a bus bar not including a slit) as shown in FIG. 2, a pair of electrode leads 150 adjacent to each other are inserted to pass between the bus bars, and the bus bar and the electrode lead 150 are welded, and in this case, are applied in a case of increasing the number of battery cells 110 as shown in FIG. 4, since the electrode leads 150 still pass only between the bus bars, a length of the electrode leads 150 has to be extended in order to reach the electrode leads 150 between the bus bars.

Meanwhile, as in the present exemplary embodiment, when the bus bar 250 including the slit 251 with one end open is used, as shown in (b) of FIG. 4, a pair of neighboring electrode leads 150 can pass not only between the bus bars 250 but also through the slits 251 formed in the bus bars 250, and thus the electrode leads 150 can pass anywhere close to the position of a pair of neighboring electrode leads 150, thereby combining the electrode leads 150 with the bus bar 250 without excessive extension of the electrode leads 150. Part (b) of FIG. 4 is a cross-section of (a) of FIG. 4, taken along the line IV-IV. The pair of neighboring electrode leads 150 pass through the space between the slits 251 of the bus bars 250 or between the neighboring bus bars 250 and thus overlap on one side of bus bar 250, and the electrode leads 150 and the bus bar 250 can be electrically connected by forming a welding portion in the overlapping portion of the electrode leads 150 and the bus bar 250.

In this process, it is necessary to adjust the number of bus bars 250 as needed, and according to the present exemplary embodiment, even if the number of bus bars 250 is adjusted, the configuration of the bus bar frame 200 to which the bus bar 250 is fixed is not changed and it is possible to adjust the number of the bus bars 250.

That is, according to the present exemplary embodiment, as shown in FIG. 1, the bus bar frame 200 includes a plurality of fixing portions 210, which protrude from the bus bar frame 200 and cover ends of the bus bars 250. The fixing portion 210 extends from a portion protruded to the outside from a lower end or an upper end (in the z-axis direction) of the bus bar frame 200 and covers the end portion of the bus bar 250. The fixing portion 210 that covers the lower end of the bus bar 250 covers the lower end of the bus bar 250 by protruding upward toward the bus bar 250 from a portion protruded to the outside from the lower end of the bus bar frame 200. The fixing portion 210 that covers the upper end of the bus bar 250 by being protruded downward (z-axis direction) toward the bus bar 250 from a portion protruded to the outside from the upper end of the bus bar frame 200.

Thus, due to such a fixing portion 210, although the number of bus bars 250 is changed, it is possible to apply it by changing only the mounting position of the bus bar 250 without changing the fixing portion 210 formed on the bus bar frame 200. Conventionally, the bus bar 250 is fixed to the bus bar frame 200 by forming a hole in the bus bar 250 and filling the hole with an injection product of the bus bar frame 200. In such a configuration, since a position where the injection product of the bus bar frame 200 is protruded is pre-determined, the bus bar 250 can be mounted only at the specified position, and accordingly, the shape of the bus bar frame 200 needs to be changed to change the number of bus bars 250 and the mounting position of the bus bar 250.

On the other hand, according to the present exemplary embodiment, the bus bar 250 is fixed by the plurality of fixing portions 210, and thus it is easy to remove and install the bus bar 250, and the number and position of the bus bar 250 can be easily changed as necessary. For example, comparing FIG. 1 and (a) of FIG. 4, each adopting the bus bar frame 200 of the same configuration, it is possible to change the mounting portion of the bus bar 250 with respect to the fixing portion 210 in a fixed state, and thus four bus bars 250 can be mounted as shown in FIG. 1, or five bus bars 250 also can be mounted by reducing a gap between the bus bars 250 as shown in (a) of FIG. 4.

In such a configuration, a gap between neighboring fixing portions 210 may be larger than a width of the slit 251 included in the bus bar 250 or smaller than a width of the bus bar 250. By adjusting the spacing of the fixing portion 210 in this way, the bus bar 250 can be easily mounted on the bus bar frame 200 using the fixing portion 210 regardless of the number and position of the bus bar 250.

Figure 5:
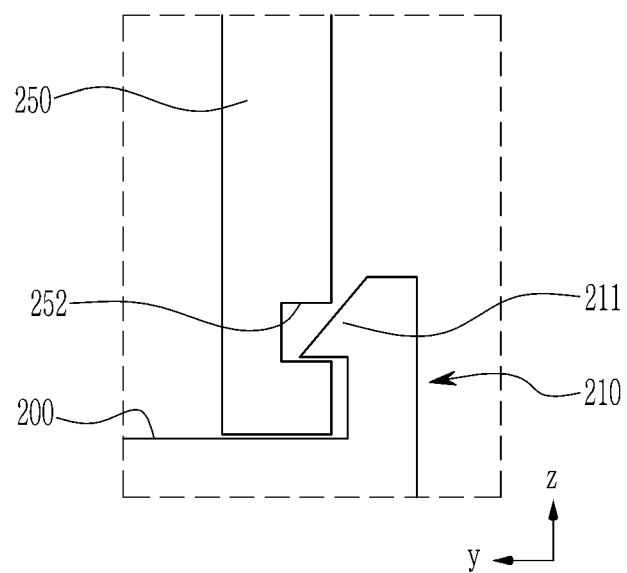
FIG. 5 is an enlarged cross-sectional view of the portion A in FIG. 1.
Figure 6:
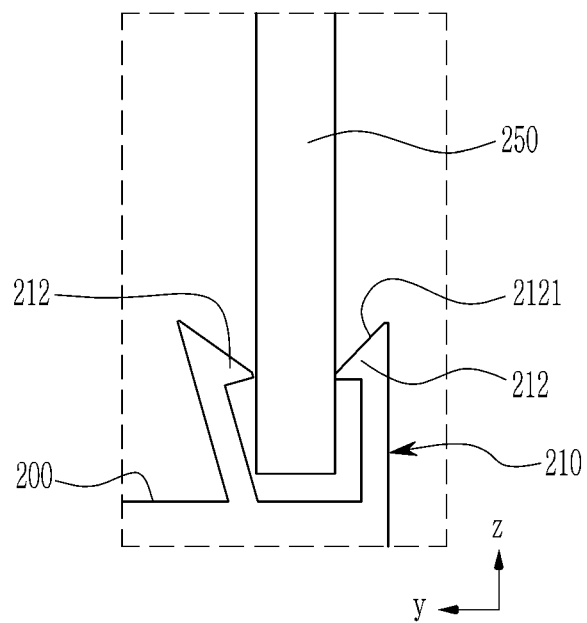
FIG. 6 is an enlarged cross-sectional view of the portion A in FIG. 1 according to another exemplary embodiment.

Referring to FIG. 5 and FIG. 6, a detailed configuration of a fixing portion 210 according to an exemplary embodiment of the present invention and another exemplary embodiment of the present invention will be described.

FIG. 5 and FIG. 6 are enlarged cross-sectional views of the portion A of FIG. 1, and respectively illustrate configurations of fixing portions 210 and bus bars 250 combined to the fixing portions 210 according to an exemplary embodiment, and according to another exemplary embodiment of the present invention.

As shown in FIG. 5, a fixing portion 210 according to an exemplary embodiment of the present invention includes a hook 211 protruding toward a bus bar 250. That is, in the present exemplary embodiment, the fixing part 210 and the bus bar 250 are combined by means of snap-fit coupling. For this, the bus bar 250 includes a groove portion 252 that is recessed inward in a position corresponding to the hook 211 so that the hook 211 can be coupled. In the present exemplary embodiment, the groove portion 252 is illustrated as a configuration for coupling with the hook 211, but the present invention is not limited thereto, and may be a hole capable of coupling with the hook 211. Thus, the bus bar 250 can be easily mounted and removed from the bus bar frame 200 by coupling and detaching the hook 211 included in the fixing portion 210 and the groove portion 252 included in the bus bar 250.

In addition, as shown in FIG. 6, a fixing portion 210 according to another exemplary embodiment of the present invention may be a holder that is formed of a pair of clamp portions 212 that protrude toward a bus bar 250 from a bus bar frame 200. Ends of the clamp portions 212 may include inclined surfaces 2121 formed to face each other. When the bus bar 250 is not mounted, a distance between the inclined surfaces 2121 facing each other is narrowed, and when the bus bar 250 is mounted by inserting the bus bar 250 between the inclined surfaces 2121, the space between the clamp portions 212 becomes wider such that the bus bar 250 can be inserted and fixed. The bus bar frame 200 is formed of an injection product, and the clamp portion 212 is formed as a part of the injection product, and thus a gap between clamp portions 212 is opened by an external force generated by inserting the bus bar 250, and the bus bar 250 can be fixed by an elastic force to return to its original state from the state that the gap between the clamp portions 212 is opened. According to the present embodiment, it is possible to mount on the bus bar frame 200 without further forming a separate configuration for fixing to the bus bar 250, and thus more various types of bus bars 250 can be mounted without limiting the position, size, and number.

Meanwhile, one or more battery modules according to the exemplary embodiment of the present invention may be packaged in a pack case to form a battery pack.

The battery module described above and the battery pack including the same can be applied to various devices. Such a device may be applied to transportation means such as electric bicycles, electric vehicles, hybrid vehicles, and the like, but the present invention is not limited thereto, and the present invention is also applicable to various devices that can use a battery module and a battery pack including the same, and this also belongs to the scope of the present invention.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

DESCRIPTION OF SYMBOLS

100: battery module
150: electrode lead
200: bus bar frame
210: fixing portion
250: bus bar
251: slit

The invention claimed is:

1. A battery module comprising:
   a battery cell stacked body where a plurality of battery cells are stacked, wherein the plurality of battery cells include a plurality of electrode leads;
   a bus bar frame including a front bus bar frame and a rear bus bar frame, the front bus bar frame formed on a front side of the battery cell stacked body and the rear bus bar frame formed on a rear side of the battery cell stacked body, the front side and the rear side being disposed opposite to one another such that the battery cell stacked body is disposed therebetween; and
   a first bus bar formed at an outer side of the bus bar frame with reference to the battery cell stacked body and arranged to be electrically connected with an external power source, the bus bar frame being disposed between the first bus bar and the battery cell stacked body,
   wherein the bus bar frame comprises a plurality of fixing portions that protrude from the bus bar frame to cover an end of the first bus bar,
   wherein the first bus bar is a flat plate having a slit with one open end, so as to define a u-shape, and
   wherein at least one of the plurality of electrode leads extend through the slit.

2. The battery module of claim 1, wherein the fixing portions are formed to cover the end of the first bus bar and an opposing end of the first bus bar in a first direction, which is a length direction of the first bus bar.

3. The battery module of claim 1, wherein at least one of the fixing portions comprises a hook protruded toward the first bus bar, and a groove that is engaged with the hook at the end of the first bus bar and an opposing end of the first bus bar.

4. The battery module of claim 1, wherein each of the battery cells comprises an electrode lead, of the plurality of electrode leads, protruded toward the bus bar frame, and a width of the electrode lead in a length direction of the first bus bar, is equal to or smaller than a length of the slit.

5. The battery module of claim 1, wherein a gap between neighboring fixing portions among the plurality of fixing portions is larger than a width of the slit and smaller than a width of the first bus bar.

6. The battery module of claim 1, wherein at least one of the fixing portions comprises a holder protruded toward the first bus bar from the bus bar frame.

7. The battery module of claim 6, wherein the holder comprises two clamp portions that protrude from a bottom surface of the bus bar frame, and include inclined surfaces that face each other at ends of the two clamp portions.

8. The battery module of claim 1, wherein each of the plurality of electrode leads protrude toward the bus bar frame, and
   two electrode leads protruded from neighboring battery cells among the plurality of electrode leads and pass between the slit of the first bus bar or between the first bus bars and a second bus bar and overlap at one side of the first bus bar.

9. The battery module of claim 8, wherein a welding portion is formed in a portion where the electrode lead and at least one of the first bus bar or the second bus bar overlap.

10. A battery pack comprising:
    at least one battery module of claim 1; and
    a pack case that packages the at least one battery module.

11. A device comprising at least one battery pack of claim 10.

* * * * *